(12) United States Patent
Fuchtling

(10) Patent No.: US 10,470,370 B2
(45) Date of Patent: Nov. 12, 2019

(54) CUTTING UNIT WITH ROTATING CONVEYOR BELTS ARRANGED AT AN ANGLE TO A LONGITUDINAL AXIS OF A CENTER SECTION

(71) Applicant: CLAAS SELBSTFAHRENDE ERNTEMASCHINEN GMBH, Harsewinkel (DE)

(72) Inventor: Christian Fuchtling, Drensteinfurt (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 73 days.

(21) Appl. No.: 15/671,726

(22) Filed: Aug. 8, 2017

(65) Prior Publication Data

US 2018/0084724 A1 Mar. 29, 2018

(30) Foreign Application Priority Data

Sep. 26, 2016 (DE) .......................... 10 2016 118 174

(51) Int. Cl.
| | |
|---|---|
| *A01D 61/00* | (2006.01) |
| *A01D 61/02* | (2006.01) |
| *A01D 41/14* | (2006.01) |
| *A01D 34/04* | (2006.01) |

(52) U.S. Cl.
CPC ........... *A01D 61/008* (2013.01); *A01D 34/04* (2013.01); *A01D 41/14* (2013.01); *A01D 61/02* (2013.01); *A01D 61/002* (2013.01)

(58) Field of Classification Search
CPC ...... A01D 57/20; A01D 41/14; A01D 61/002; A01D 61/02; A01D 61/008; A01D 43/08; A01D 41/16; A01D 2017/103; A01D 34/04; B65G 23/44; B65G 15/12; A01F 12/10

See application file for complete search history.

(56) References Cited

U.S. PATENT DOCUMENTS

| | | | | |
|---|---|---|---|---|
| 2,608,041 | A | * | 8/1952 | Schoenrock ......... A01D 61/008 198/518 |
| 5,464,371 | A | | 11/1995 | Honey |
| 5,822,959 | A | * | 10/1998 | Norton ................... A01D 41/10 56/1 |
| 6,202,397 | B1 | * | 3/2001 | Watts ................... A01D 61/002 56/14.5 |

(Continued)

OTHER PUBLICATIONS

International Search Report for European Patent No. 17168329 dated Oct. 30, 2017 (7 pages).

*Primary Examiner* — Arpad Fabian-Kovacs
(74) *Attorney, Agent, or Firm* — Lempia Summerfield Katz LLC

(57) ABSTRACT

A cutting unit includes a center section arranged on a base frame and at least two side portions adjoining the center section, a knife bar extending basically over the entire width of the cutting unit, and at least one conveyor arranged behind the knife bar, which conveyor transports crops cut by the knife bar laterally in the direction of the center section, which has at least one conveying system conveying transverse to the transport direction of the conveyor, wherein the conveying system includes at least two rotating conveyor belts, which are arranged at an inclination at an angle (α) to the longitudinal axis (LA) of the center section.

20 Claims, 4 Drawing Sheets

(56) References Cited

U.S. PATENT DOCUMENTS

| | | | |
|---|---|---|---|
| 6,817,166 B2 | 11/2004 | Dunn | |
| 7,470,180 B2 * | 12/2008 | Honey | A01D 41/16 460/105 |
| 7,472,533 B2 * | 1/2009 | Talbot | A01D 57/20 56/181 |
| 7,587,885 B2 * | 9/2009 | Tippery | A01D 57/20 56/14.5 |
| 7,802,417 B2 * | 9/2010 | Sauerwein | A01D 41/14 56/181 |
| 7,823,372 B1 | 11/2010 | Kraus | |
| 8,281,561 B2 * | 10/2012 | Dow | A01D 57/20 56/181 |
| 9,161,492 B2 * | 10/2015 | Fuechtling | A01D 41/14 |
| 2005/0016147 A1 * | 1/2005 | Patterson | A01D 41/14 56/181 |
| 2005/0284124 A1 * | 12/2005 | Patterson | A01D 61/006 56/364 |
| 2006/0254241 A1 * | 11/2006 | Kempf | A01D 57/20 56/16.6 |
| 2008/0295474 A1 | 12/2008 | Tippery et al. | |
| 2012/0047866 A1 * | 3/2012 | Fuechtling | A01D 41/14 56/153 |
| 2014/0298765 A1 * | 10/2014 | Fuechtling | A01D 61/02 56/10.2 R |
| 2016/0183462 A1 * | 6/2016 | Magisson | A01D 47/00 56/189 |
| 2016/0360699 A1 * | 12/2016 | Allochis | A01D 43/06 |
| 2017/0113876 A1 * | 4/2017 | Jager | A01D 61/02 |
| 2017/0223896 A1 * | 8/2017 | Schmid | A01D 67/00 |
| 2017/0251606 A1 * | 9/2017 | Van Overschelde | A01F 12/10 |

\* cited by examiner

CUTTING UNIT WITH ROTATING CONVEYOR BELTS ARRANGED AT AN ANGLE TO A LONGITUDINAL AXIS OF A CENTER SECTION

BACKGROUND

Cutting units may be designed in the form of a so-called tape cutter, which are characterized by a high degree of flexibility in adapting to the ground contour of an area to be worked. This is achieved by relinquishing a rigid cutting table, which is customarily used in grain cutting machines. One type of tape cutter has side portions that include at least one continuously rotating mechanically driven conveyor belt, which is supported by a plurality of support arms of the respective side portion pivoted about an axis of rotation. Other well-known tape cutters include rigid side portions and knife bars. The respective conveyor belts transport crops harvested by the knife bar in lateral direction, i.e., transverse to the longitudinal axis of the cutting unit, to the center section. The center section includes at least one conveying system conveying transverse to the transport direction of the conveyor belts. The conveying system accepts and redirects the crops conveyed laterally. Through an opening in the area of the center section provided in the base frame, the crops are removed and transferred for further processing to a harvester, which supports the cutting unit.

U.S. Pat. No. 6,817,166 B2 discloses a generic cutting unit. U.S. Pat. No. 6,817,166 B2 describes a cutting unit, which includes a center section arranged on a base frame and at least two side portions adjoining the center section. A knife bar, extending basically over the entire width of the cutting unit, is used for harvesting crops. Behind the knife bar, a conveyor is arranged on the respective side portion, which conveyor transports the crops cut by the knife bar laterally in the direction of the center section. The center section includes a conveying system, which conveys transverse to the transport direction of the conveyor and which is designed in the form of a continuously rotating conveyor belt. In transport or conveying direction, the surface of the conveyor belt is provided with a plurality of bands arranged in pairs one after another. In transport direction of the conveyor belt, the respectively adjoining bands are slightly inclined. They are arranged in such a way that the outer ends of the bands facing the outer edge of the conveyor belt lead in the transport direction the ends facing each other in the center of the conveyor belt. These bands improve the acceptance of crops, which are transferred from the conveyor belts of the side portions to the lower conveyor belt of the center section.

SUMMARY

The present disclosure relates to a cutting unit, which includes a center section arranged on a base frame and at least two side portions adjoining the center section, a knife bar extending basically over the entire width of the cutting unit, and at least one conveyor arranged behind the knife bar. The conveyor transports crops cut by the knife bar laterally in the direction of the center section, which has at least one conveying system conveying transverse to the transport direction of the conveyor. The present disclosure provides a cutting unit that provides an improved acceptance of crops and transfer of crops in the center section.

In one embodiment, the conveying system includes at least two, separate and continuously rotating conveyor belts, which are each arranged at an opposite inclination at an angle to the longitudinal axis of the center section. The inclined arrangement of the conveyor belts allows the crops to be brought together at the center of the center section, so that less crops are backed up on the sides of the center section. Through this arrangement, the transition areas from the conveyor belts of the side portions to the conveyor belts of the center section are relieved in that the respective conveyor belt of the adjoining side portion reduces the flow of the crops toward the lower side of the cutting unit. This results in less cutting unit losses. The danger that transition areas are blocked as a result of accumulating crops is also considerably reduced. The crops tend to be jammed in the transition area between the laterally rotating conveyor belts and the transversely rotating lower conveyor belt. This, in turn, can result in blocking the cutting unit. The arrangement of having at least two conveyor belts on the center section results in the crops coming from the side portions not being redirected almost at right angles when the crops are accepted by the conveyor belts of the center section, as this is the case with the cutting unit according to U.S. Pat. No. 6,817,166 B2. Another disadvantage of the center section of the conveyor belt disclosed in U.S. Pat. No. 6,817,166 B2 involves the fact that the bands on the conveyor belt surface are arranged in such a way that they are inclined in conveying direction. In relation to the longitudinal axis of the conveyor, the bands can have a very small inclination, because otherwise problems may be encountered in the area of the drive and guide rollers, which can result in damaging the conveyor belt. It is also possible to provide at least one further conveyor belt in the center section of the cutting unit, which is arranged between the inclined conveyor belts.

Preferably, the at least two conveyor belts basically have a V-shaped design, wherein the conveyor belts are merged in the transport direction. At the same time, the two conveyor belts of the center section respectively are arranged in mirror image at the same angle relative to the longitudinal axis.

According to an advantageous further development, it can be provided that, originating from the knife bar, a component, which takes a V-shaped course in its longitudinal extension, extends between the conveyor belts. The V-shaped component covers at least partially the area between the conveyor belts, which are arranged at an inclination in relation to the longitudinal axis of the center section. At least in sections, the surface of the V-shaped component can be positioned at the same height with upper side of the conveyor belts. This makes it possible at least to minimize the crops that are inadvertently deposited on the surface of the V-shaped component.

In addition, the component can take a tapering course in the transport direction of the conveyor belts. Basically, the V-shaped component may be adjusted to the course of the arrangement of the conveyor belts in the center section. As a result, it is possible to avoid open areas between the conveyor belts in the center section. This prevents crops from passing through especially between the continuously rotating conveyor belts.

According to one advantageous embodiment, the V-shaped component may have a roof-like surface, which is designed to be sloping toward both of the outer longitudinal edges bordering the component. In particular, the V-shaped component can have a triangular cross-section. In this way, it is possible to achieve a type of scraping effect because the tapered sides of the V-shaped component make it difficult for the crops to be deposited or accumulated. In this way, crops that are accepted by the cutting unit in the center section between the conveyor belts can flow into the receiving area of at least one of the two conveyor belts.

Preferably, the V-shaped component can have on its outer longitudinal edges facing the respective conveyor belt a section extending to the outside, which overlaps sections of the surface of the respective conveyor belt. A convex section has the purpose of sealing the respectively adjacent conveyor belt to prevent the crops from flowing between the respective continuously rotating conveyor belts. The respective section may have a basically L-shaped profile.

To achieve a low-wear seal on the outer longitudinal edge of the respective section in relation to the overlapping conveyor belt section, it is possible to arrange at least one sealing component produced from an elastic material at the side of the respective section facing the conveyor belt. The sealing component is placed on the surface of the conveyor belt.

In particular, the respective conveyor belt can surround in sections two rollers arranged in parallel to one another, as well as one clamping device, which is arranged between the rollers, for the purpose of adjusting the distance of the rollers. By arranging the clamping device interiorly of, or between, the rotating conveyor belt, it is possible to achieve a space-efficient housing.

The clamping device can have an actuating lever, which projects in sections laterally beyond the outer edge of the conveyor belt on the side facing the V-shaped component and extends in locking position parallel to the conveyor belt.

In a further development, the conveyor belts of the center section can be actuated independently from one another. By appropriately monitoring the amount of crops received from the side sections of the cutting unit and controlling the respective actuating technology of the conveyor belts, it is possible to respond to temporary fluctuations when receiving the crops from the conveyor belts in the center section.

BRIEF DESCRIPTION OF THE DRAWINGS

The present invention is described in more detail by means of an embodiment depicted in the drawings.

It is shown.

DETAILED DESCRIPTION

Figure 1:
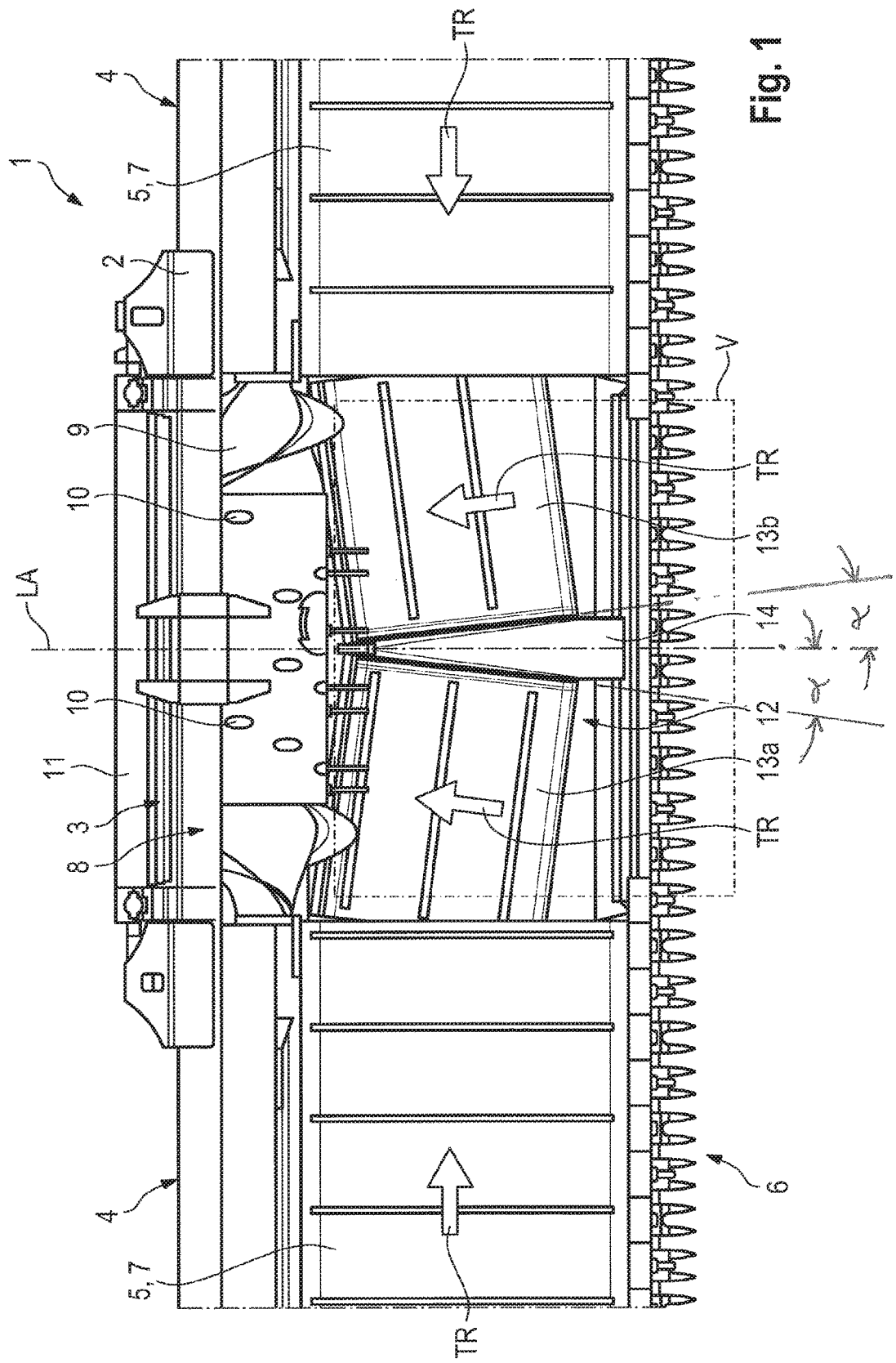
FIG. 1 a schematic partial top view of a cutting unit.

FIG. 1 shows a schematic partial top view of a cutting unit 1. The cutting unit 1 is designed in the form of a so-called tape cutter, which is characterized by a high degree of flexibility in adapting to the ground contour of an area to be worked, or harvested. The cutting unit 1 has a base frame 2, on which a center section 3 and at least two side portions 4 adjoining the center section 3 are arranged. At the center section 3 and the side portions 4, a knife bar 6 is arranged on the front side located opposite of the base frame 2, which knife bar 6 extends basically over the entire width of the cutting unit 1. Furthermore, on the base frame 2 of the cutting unit 1, reels are arranged (not shown), which extend over the width of the side portion 4, as well as partially over the width of the center section 3. The reels have the purpose of improving the acceptance of the crops by the knife bar 6.

The crops cut by the knife bar 6 are supplied to a conveyor 5, which is arranged behind the knife bar 6 and which includes, on the respective side portions 4, at least one continuously rotating lateral conveyor belt 7. The continuously rotating lateral conveyor belts 7 are adjoining the center section 3, in order to transport the crops cut by the knife bar 6 parallel to the longitudinal axis of the cutting unit 1 in the direction of the center section. In the area of the center section 3, the crops are supplied to a feeding device 8. The feeding device 8 is designed in the form of a driven feeding roller 9, which is supported on the base frame 2 by means of frame components. The feeding roller 9 has retractable fingers 10. The feeding device 8 guides the crops supplied laterally by the continuous conveyor belts 7 to the center section 3 to an opening provided in the base frame 2 behind the feeding roller 9. The cut crops are transferred through an intake duct 11 (only shown in outlines) of a combine harvester, on which the cutting unit 1 can be mounted, to the combine harvester for further processing.

The center section 3 comprises a conveying system 12, which has at least two continuously rotating conveyor belts 13a, 13b. Arrows identified with the reference numeral TR indicate the transport or conveying direction of the conveyor belts 13a, 13b. Both conveyor belts are arranged, in mirror image, at an inclination to the longitudinal axis LA of the center section 3. The adjoining lateral conveyor belts 7 arranged on the side portions 4 overlap in sections the respective conveyor belt 13a, 13b. The arrangement of the conveyor belts 13a, 13b is selected in such a way that they basically have a V-shaped design. For this purpose, the two conveyor belts 13a, 13b are oriented or angled in transport direction TR. In particular, the respective conveyor belts 13a, 13b, or the conveying direction/axis thereof as defined by TR, and the longitudinal axis of the center section 3 are each arranged at an angle α as shown in FIG. 1 that is greater than or equal to 5°. This arrangement has the advantage that the crops coming from the lateral conveyor belts 7 do not have to be redirected by an angle of 90° when they are transferred to the center section. The V-shaped arrangement of the conveyor belts 13a, 13b results in the crops being merged in the central area of the center section 3, which reduces the crops from being backed up on the center section 3 toward the lateral conveyor belts 7.

Between the conveyor belts 13a, 13b of the center section 3, a component 14 is arranged, which takes a basically V-shaped course, or shape, as it narrows in its longitudinal extension. The component 14 is tapered in the transport direction TR of the conveyor belts 13a, 13b. The component 14 basically extends between the two conveyor belts 13a, 13b, so that the area, which otherwise remains free because of the inclined arrangement of the two conveyor belts, is covered. It is also possible to arrange a further conveyor belt between the two V-shaped conveyor belts 13a, 13b.

Figure 2:
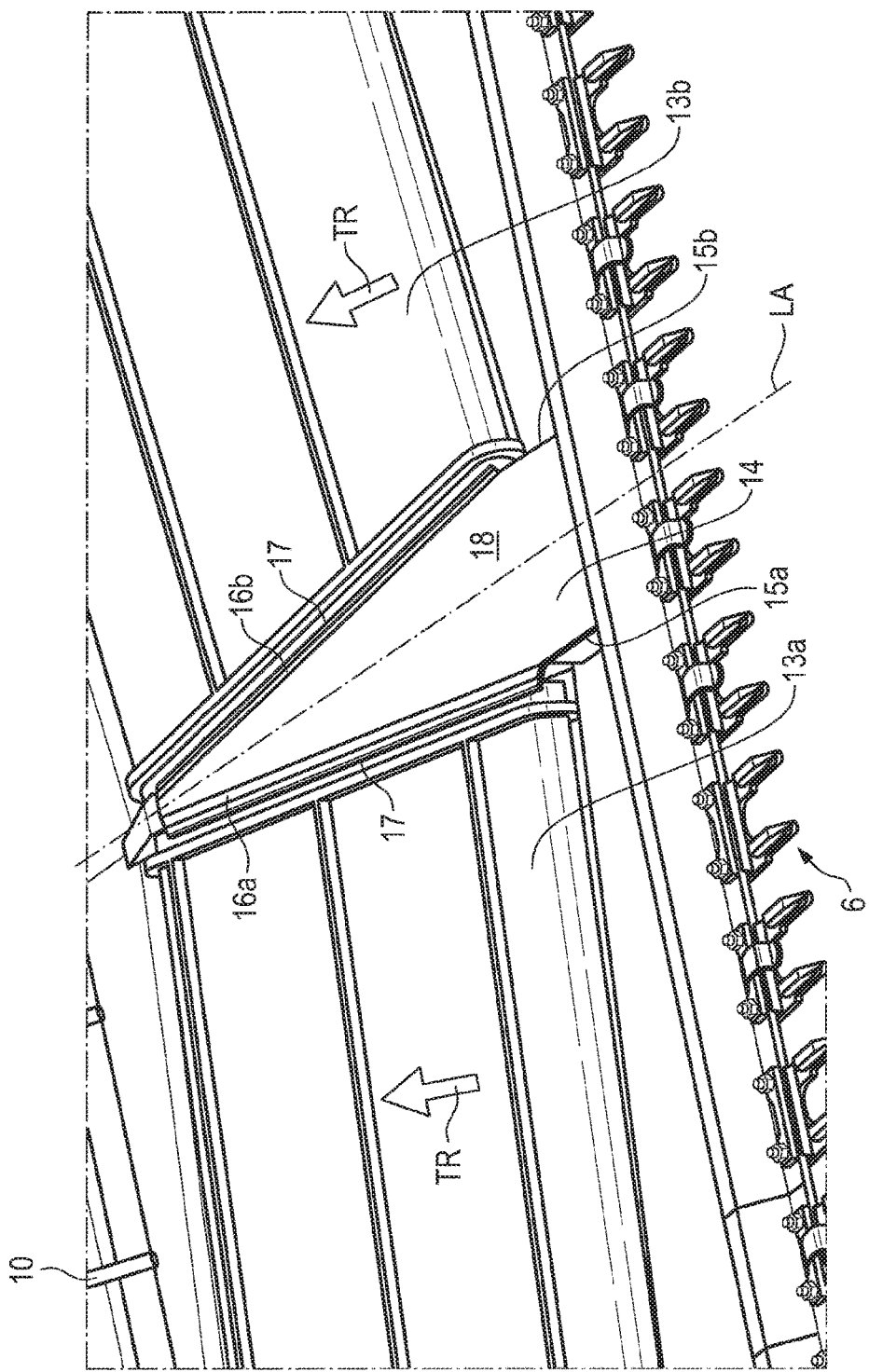
FIG. 2 a perspective detailed view V of the cutting unit shown in FIG. 1 having a component, which takes a V-shaped course.

The depiction in FIG. 2 shows a perspective detailed view V of the cutting unit 1 shown in FIG. 1 having a component 14, which takes a V-shaped course. Preferably, the component 14 is produced in one piece. It is also possible to produce the component 14 in at least two pieces. In a two-piece design of the component 14, the two pieces would be produced in a laterally reserved manner in relation to the longitudinal axis LA of the center section 3. On its outer longitudinal edges 15a or 15b facing the respective conveyor belt 13a, 13b, the component 14 has a section 16a or 16b, or flange, which respectively extends laterally to the outside. These sections 16a, 16b overlap in sections the surface of the respective conveyor belt 13a, 13b. At the same time, the sections 16a, 16b can be arched or can have a beveled, in particular basically L-shaped, profile or cross-section. As further shown in FIG. 2, the component 14 has a planar surface 18 between the outer longitudinal edges 15a or 15b. On the side of the respective section 16a, 16b facing the conveyor belt 13a, 13b, a sealing component 17 produced from an elastic material is arranged.

Figure 3:
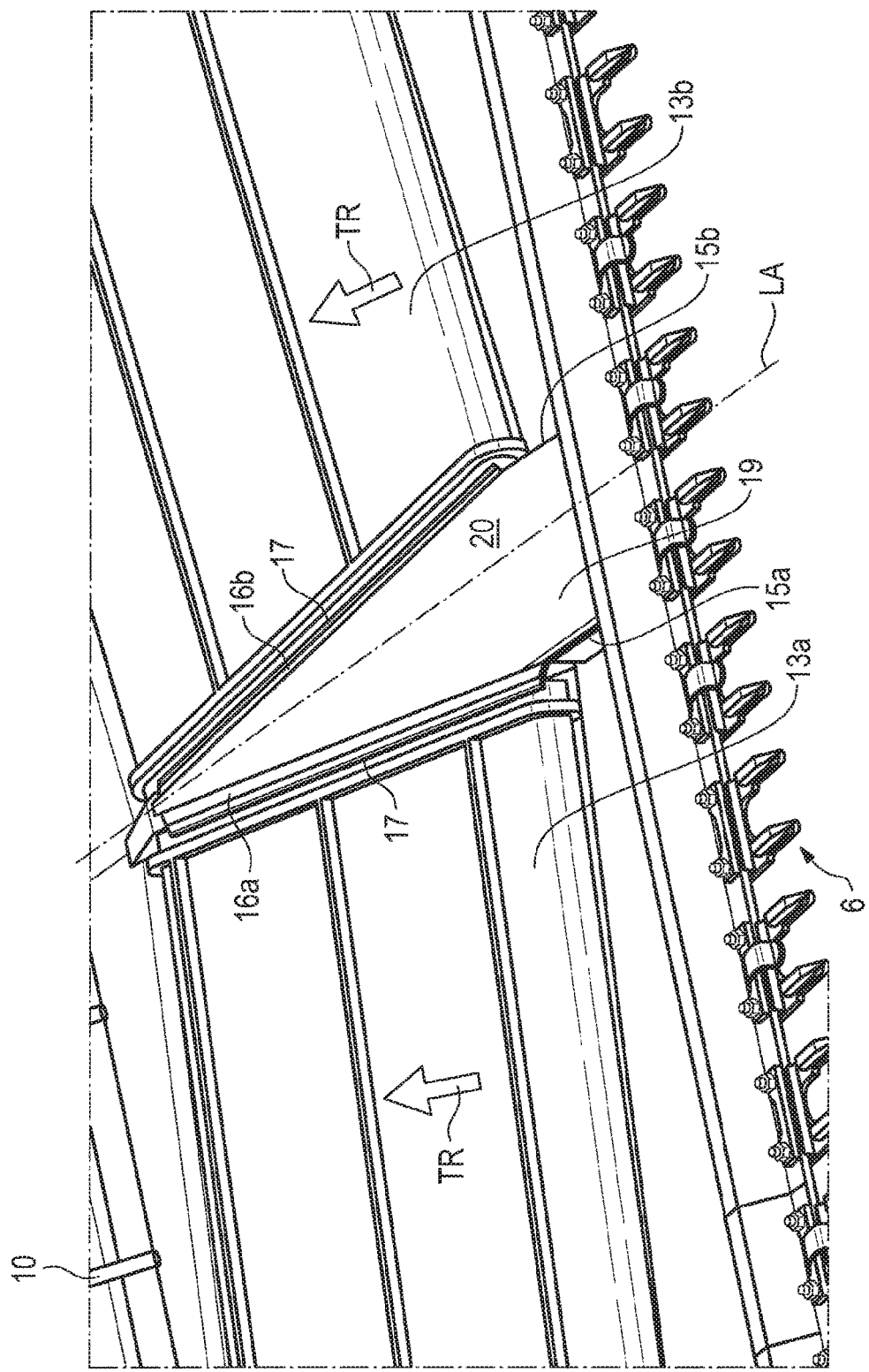
FIG. 3 a perspective view of a detail of the cutting unit shown in FIG. 1 having a modified component.

FIG. 3 shows a perspective view of a detail of the cutting unit 1 shown in FIG. 1 having a modified component 19. Component 19 differs from component 14 shown in FIG. 2 in that it has a roof-like surface 20, which is designed to be sloping from a centerline toward the outer longitudinal edges 15a or 15b. At the same time, the modified component 19 has a triangular cross-sectional profile.

Figure 4:
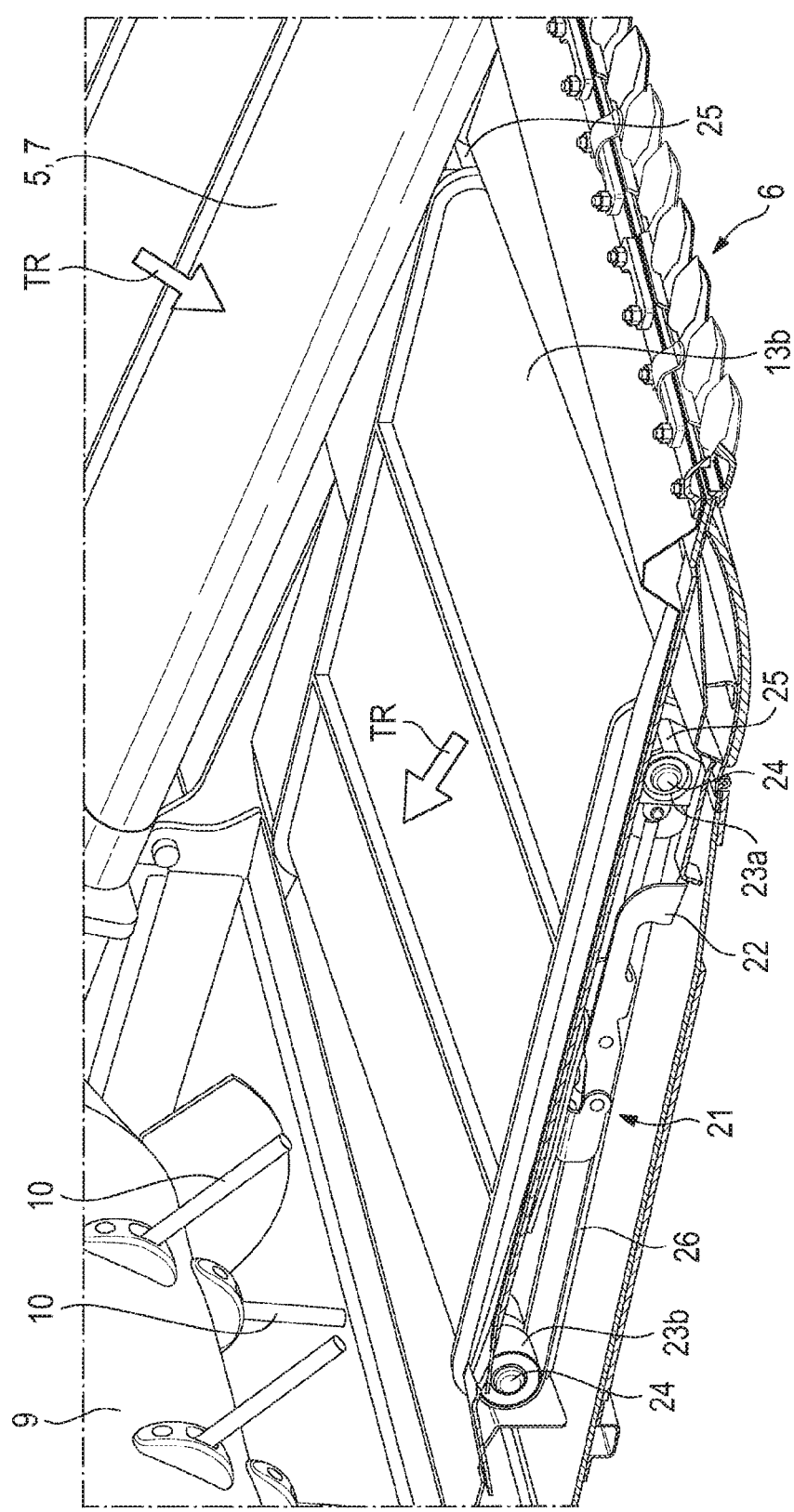
FIG. 4 a perspective partial view, partially sectioned, of a center section of the cutting unit shown in FIG. 1.

The depiction in FIG. 4 shows a perspective partial view, partially sectioned, of a center section of the cutting unit shown in FIG. 1. In this view, only one conveyor belt 13b is shown. Because of the symmetrical structure of the conveyor 5, the following description applies also to the conveyor belt 13a not shown. The conveyor 5 includes rollers 23a, 23b in the front and in the rear, arranged in pairs and used for actuation and reversing, with the respective conveyor belt 13a, 13b surrounding said rollers. Each of the rollers 23a, 23b has an axis 24, which is pivoted in bearing points 25 arranged on both sides of the conveyor belt 13b. The axes 24 are parallel. The bearing points 25 are directly adjoining the conveyor belt 13b or the roller 23a, 23b. The respective bearing point 25 has a housing, which surrounds in sections the conveyor belt 13b in the reversing section of the roller 23a, 23b. The section of the housing of the bearing point 25 surrounding the conveyor belt 13b in peripheral direction is used as a scraper to prevent crops from being carried along on the conveyor belt 13b.

FIG. 4 also shows that a clamping device 21 is provided, by means of which the belt tension of the conveyor belt 13b can be adjusted or reset by changing the distance of the rollers 23a, 23b. The function of the clamping device 21 is based on a knee lever arrangement. An actuating lever 22, which is shown in FIG. 4 in locking position, is used to actuate the clamping device 21. The clamping device 21 is arranged between the rotating conveyor belt 13b, which is space-efficient. On the side facing the V-shaped component 14, the actuating lever 22 projects in sections laterally beyond an outer edge 26 of the conveyor belt 13b. At the same time, the actuating lever 22 extends in locking position parallel to the conveyor belt 13b. To be able to retension the respective conveyor belt 13a, 13b, it is possible to remove the component 14. The actuating lever 22 thus exposed can now be handled by an operator in order to retension the conveyor belt 13b. A further advantage results from the fact that the clamping device 21 is constructed as one unit with the respective conveyor belt 13a, 13b.

REFERENCE LIST

| 1   | cutting unit         | TR | transport direction |
|-----|----------------------|----|---------------------|
| 2   | base frame           | LA | longtudinal axis    |
| 3   | center section       | α  | angle               |
| 4   | side portion         |    |                     |
| 5   | conveyor             |    |                     |
| 6   | knife bar            |    |                     |
| 7   | lateral conveyor belt|    |                     |
| 8   | feeding device       |    |                     |
| 9   | feeding roller       |    |                     |
| 10  | retractable fingers  |    |                     |
| 11  | intake duct          |    |                     |
| 12  | conveying system     |    |                     |
| 13a | conveyor belt        |    |                     |
| 13b | conveyor belt        |    |                     |
| 14  | component            |    |                     |
| 15a | outer longitudinal edge |  |                   |
| 15b | outer longitudinal edge |  |                   |
| 16a | outer section        |    |                     |
| 16b | outer section        |    |                     |
| 17  | sealing component    |    |                     |
| 18  | planar surface       |    |                     |
| 19  | component            |    |                     |
| 20  | roof-like surface    |    |                     |
| 21  | clamping device      |    |                     |
| 22  | actuating lever      |    |                     |
| 23  | rollers              |    |                     |
| 24  | axis                 |    |                     |
| 25  | bearing point        |    |                     |
| 26  | outer edge           |    |                     |

The invention claimed is:

1. A cutting unit comprising:
a center section arranged on a base frame;
at least two side portions adjoining the center section;
a knife bar extending along a width of the cutting unit;
a first lateral conveyor comprising a first lateral conveyor belt and a second lateral conveyor comprising a second lateral conveyor belt, the first lateral conveyor belt and the second lateral conveyor belt arranged behind the knife bar and adapted to transport crops cut by the knife bar in a first transport direction and a second transport direction, respectively laterally toward the center section, wherein the second transport direction is opposite the first transport direction and wherein the first transport direction and second transport direction are perpendicular to a longitudinal axis of the center section; and
at least one conveying system comprising a first rotating conveyor belt and a second rotating conveyor belt which are disposed in a common plane and each arranged at an inclination at an angle ($\alpha$) of about 5 degrees to the longitudinal axis of the center section resulting in a separation between the first rotating conveyor belt and the second rotating conveyor belt at a side facing the knife bar,
wherein at least a part of the first lateral conveyor belt overlaps at least a corner of the first rotating conveyor belt which is faced by the knife bar and the first lateral conveyor belt, and
wherein at least a part of the second lateral conveyor belt overlaps at least a corner of the second rotating conveyor belt which is faced by the knife bar and the second lateral conveyor belt.

2. A cutting unit according to claim 1, wherein the first rotating conveyor belt and the second rotating conveyor belt have in combination a V-shaped design.

3. A cutting unit according to claim 1, wherein a V-shaped component originates from the knife bar and extends between the first rotating conveyor belt and the second rotating conveyor belt; and
wherein the V-shaped component is tapered in the longitudinal axis.

4. A cutting unit according to claim 3, wherein the V-shaped component has a roof-like surface that slopes from a centerline toward outer longitudinal edges bordering the V-shaped component.

5. A cutting unit according to claim 3, wherein the V-shaped component has on its outer longitudinal edges facing, respectively the first rotating conveyor belt and the second rotating conveyor belt, a section extending laterally outwardly and overlapping sections of a surface of the first rotating conveyor belt and the second rotating conveyor belt.

6. A cutting unit according to claim 5, wherein at least one sealing component comprising an elastic material is arranged at a first side of the V-shaped component facing the first rotating conveyor belt and at a second side of the V-shaped component facing the second rotating conveyor belt.

7. A cutting unit according to claim 3, wherein the V-shaped component is detachably mounted on a frame component of the center section.

8. A cutting unit according to claim 3, wherein each of the first rotating conveyor belt and the second rotating conveyor belt surrounds two rollers arranged in parallel to one another and a clamping device arranged between the two rollers, wherein the clamping device is adapted to adjust a distance between the two rollers.

9. A cutting unit according to claim 8, wherein the clamping device comprises an actuating lever projecting laterally beyond an outer edge of a respective conveyor belt on a side facing the V-shaped component and extends in locking position parallel to the respective conveyor belt.

10. A cutting unit according to claim 1, wherein the at least a part of the first lateral conveyor belt overlaps only the corner of the first rotating conveyor belt; and
wherein the at least a part of the second lateral conveyor belt overlaps only the corner of the second rotating conveyor belt.

11. A cutting unit according to claim 1, wherein the at least a part of the first lateral conveyor belt overlaps only the corner of the first rotating conveyor belt; and
wherein the at least a part of the second lateral conveyor belt overlaps only the corner of the second rotating conveyor belt.

12. A conveyor comprising:
a first lateral conveyor belt conveying crops in a first transport direction;
a second lateral conveyor belt conveying the crops in a second transport direction, the second transport direction being opposite to the first transport direction; and
a first rotating conveyor belt and a second rotating conveyor belt,
wherein the first lateral conveyor belt is positioned to the right of the first rotating conveyor belt in order to convey the crops onto the first rotating conveyor belt,
wherein the second lateral conveyor belt is positioned to the left of the second rotating conveyor belt in order to convey the crops onto the second rotating conveyor belt,
wherein the first rotating conveyor belt and the second rotating conveyor belt are disposed in a common plane,
wherein the first lateral conveyor belt overlaps a lower right corner of the first rotating conveyor belt,
wherein the second lateral conveyor belt overlaps a lower left corner of the second rotating conveyor belt,
wherein the first rotating conveyor belt and the second rotating conveyor belt are arranged at an inclination at an angle ($\alpha$) of about 5 degrees to a longitudinal axis oriented perpendicular to the first transport direction resulting in a separation of the first rotating conveyor belt and the second rotating conveyor belt at a side facing a knife bar,
wherein the conveyor is for a cutting unit, and
wherein the knife bar extends along a width of the cutting unit.

13. A conveyor according to claim 12, wherein the first rotating conveyor belt and the second rotating conveyor belt have in combination a V-shaped design.

14. A conveyor according to claim 12, wherein a V-shaped component extends between the first rotating conveyor belt and the second rotating conveyor belt; and
wherein the V-shaped component is tapered in the longitudinal axis.

15. A conveyor according to claim 14, wherein the V-shaped component has a roof-like surface that slopes from a centerline toward outer longitudinal edges bordering the V-shaped component.

16. A conveyor according to claim 14, wherein the V-shaped component has on its outer longitudinal edges facing, respectively the first rotating conveyor belt and the second rotating conveyor belt, a section extending laterally outwardly and overlapping sections of a surface of the first rotating conveyor belt and the second rotating conveyor belt.

17. A conveyor according to claim 16, wherein at least one sealing component comprising an elastic material is arranged at a first side of the V-shaped component facing the first rotating conveyor belt and at a second side of the V-shaped component facing the second rotating conveyor belt.

18. A conveyor according to claim 14, wherein the first rotating conveyor belt and the second rotating conveyor belt each surrounds two rollers arranged in parallel to one another and a clamping device arranged between the two rollers, wherein the clamping device is adapted to adjust a distance between the two rollers; and
wherein the clamping device comprises an actuating lever projecting laterally beyond an outer edge of a respective conveyor belt on a side facing the V-shaped component and extends in locking position parallel to the respective conveyor belt.

19. A conveyor according to claim 12, wherein the first lateral conveyor belt overlaps only the lower right corner of the first rotating conveyor belt; and
wherein the second lateral conveyor belt overlaps only the lower left corner of the second rotating conveyor belt.

20. A conveyor according to claim 12, wherein the first lateral conveyor belt overlaps only the lower right corner of the first rotating conveyor belt; and
wherein the second lateral conveyor belt overlaps only the lower left corner of the second rotating conveyor belt.

* * * * *